US006742470B2

(12) United States Patent
Keithly

(10) Patent No.: US 6,742,470 B2
(45) Date of Patent: Jun. 1, 2004

(54) BIRD DETERRING APPARATUS

(76) Inventor: Douglas Keithly, 307 N. 96th Ave., Yakima, WA (US) 98908

( * ) Notice: Subject to any disclaimer, the term of this patent is extended or adjusted under 35 U.S.C. 154(b) by 0 days.

(21) Appl. No.: 10/227,156

(22) Filed: Aug. 22, 2002

(65) Prior Publication Data

US 2004/0035351 A1 Feb. 26, 2004

(51) Int. Cl.⁷ .............................................. G01B 13/12
(52) U.S. Cl. ..................................... 116/22 A; 116/81
(58) Field of Search ............................ 116/22 A, 67 R, 116/81, 75; 52/101; 43/1, 2, 124

(56) References Cited

U.S. PATENT DOCUMENTS

| 2,258,803 A | * | 10/1941 | Peles ............................ 52/101 |
| 2,304,358 A | | 12/1942 | Hennefer ...................... 116/67 |
| 2,308,893 A | * | 1/1943 | Pavloff et al. ................. 52/101 |
| 2,731,937 A | * | 1/1956 | Rhodes ...................... 116/22 A |
| 3,292,319 A | | 12/1966 | McCarthy ..................... 52/101 |
| 3,436,882 A | * | 4/1969 | Keefe ........................ 116/22 A |
| 3,897,195 A | | 7/1975 | Finch ........................... 431/19 |
| 4,074,653 A | | 2/1978 | Pember ..................... 116/22 A |
| 4,109,605 A | * | 8/1978 | Bachli ....................... 116/22 A |
| 4,475,102 A | | 10/1984 | Troy et al. ................... 340/385 |
| 4,573,427 A | | 3/1986 | Knozak ..................... 116/22 A |
| 4,597,357 A | | 7/1986 | LeMessurier ............. 116/22 A |
| 4,598,660 A | | 7/1986 | Konzak ..................... 116/22 A |
| 4,656,770 A | | 4/1987 | Nuttle ............................. 43/2 |
| 4,841,914 A | | 6/1989 | Chatten .................. 119/97 AR |
| 4,862,637 A | | 9/1989 | Dressel ......................... 43/98 |
| 4,962,619 A | | 10/1990 | Chatten ........................ 52/101 |
| 5,146,867 A | * | 9/1992 | Goldschmidt ............ 116/22 A |
| 5,257,012 A | | 10/1993 | Metcalf ....................... 340/573 |
| 5,353,543 A | | 10/1994 | Teraoka ........................ 43/124 |
| 5,450,063 A | | 9/1995 | Peterson et al. ............ 340/573 |
| 5,497,585 A | | 3/1996 | Engler .......................... 52/101 |
| 5,713,160 A | * | 2/1998 | Heron .......................... 52/101 |
| 5,845,607 A | | 12/1998 | Kastner et al. ............. 119/903 |
| 5,918,404 A | | 7/1999 | Ohba .............................. 43/1 |
| 5,977,866 A | | 11/1999 | Joseph, Jr. et al. ...... 340/384.1 |
| 5,986,551 A | | 11/1999 | Pueyo et al. ................ 340/573 |
| 6,003,471 A | | 12/1999 | Ohba ........................... 119/713 |
| 6,250,255 B1 | | 6/2001 | Lenhardt et al. ............ 119/713 |
| 6,257,146 B1 | | 7/2001 | Stonebraker ................ 102/346 |
| 6,376,047 B1 | | 4/2002 | Hasegawa ................... 428/193 |

FOREIGN PATENT DOCUMENTS

| FR | 2684271 A1 | * | 6/1993 | ............... 116/22 A |
| GB | 2221232 A | * | 1/1990 | ............... 116/22 A |

* cited by examiner

Primary Examiner—Christopher W. Fulton
Assistant Examiner—Travis Reis
(74) Attorney, Agent, or Firm—Pedersen & Co., PLLC; Ken J. Pedersen; Barbara S. Pedersen

(57) ABSTRACT

A bird-deterring apparatus for protecting agricultural crops and other areas from marauding birds and/or other pests comprises one or more supports for holding a wire or other elongated member in a taut condition over the area being protected. Preferably, the support system comprises at least two nominally upright support columns in a spaced apart relationship spanning the area to be protected and a predetermined number of wires tautly secured between these columns. Noise-making containers including, in the preferred embodiment, metal pellets and glass shards are flexible suspended from the taut wires at selected intervals. A system for moving the taut wires preferably in a sudden manner to shake or rattle noise-making containers is provided. A control system is provided to actuate this wire movement and noise-production, either in response to a sensing of a bird(s) or pest, or at preprogrammed times that are effective in scaring the bird/pest and that preferably are random or unexpected so that the bird/pest does not become accustomed or "immune" to the noise.

11 Claims, 4 Drawing Sheets

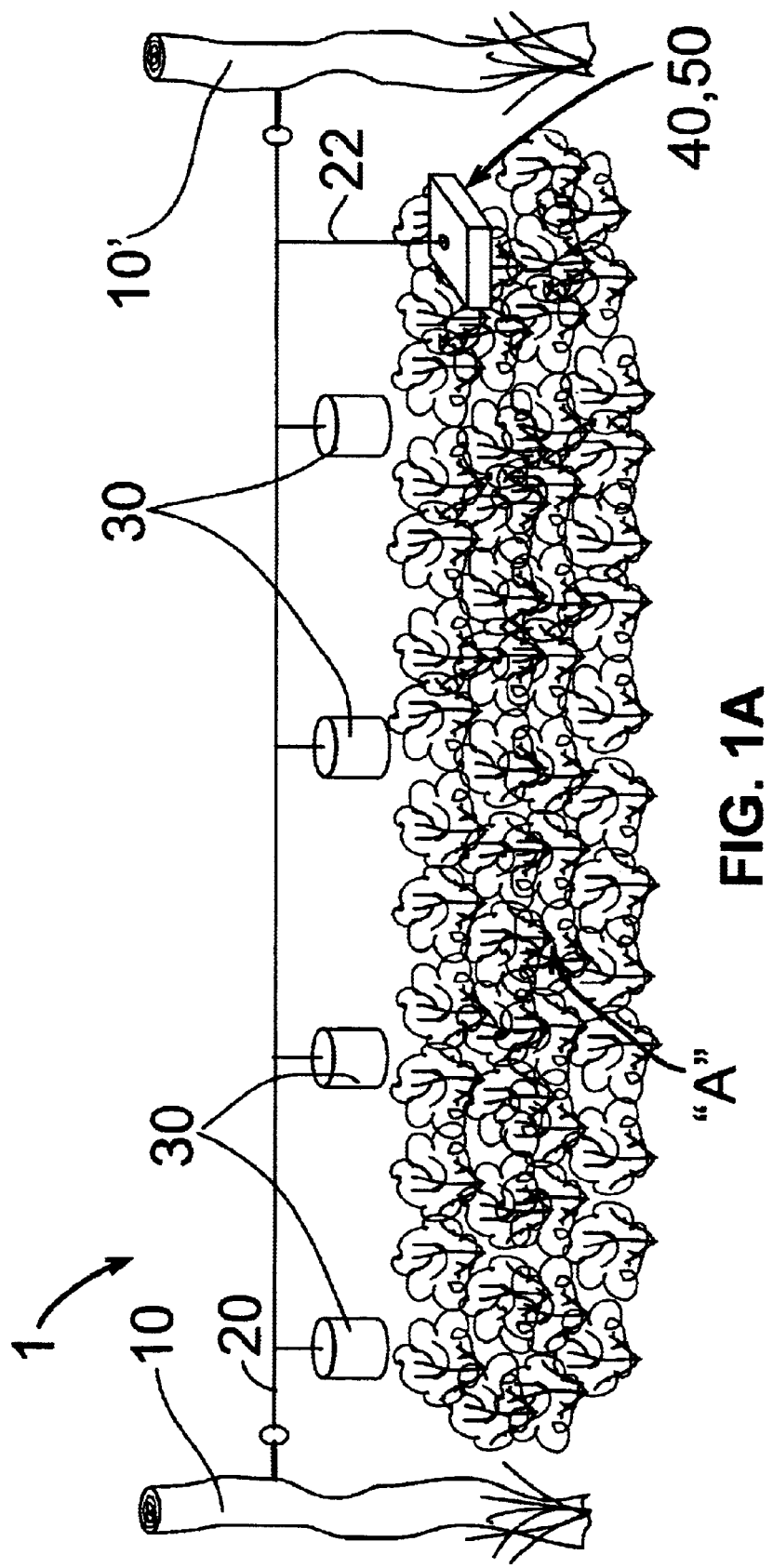

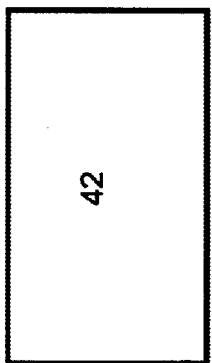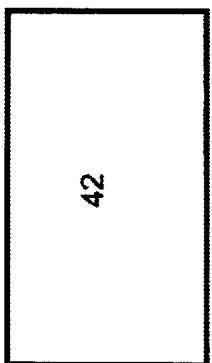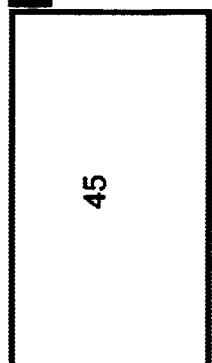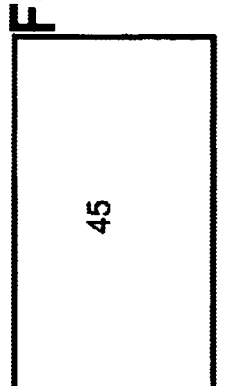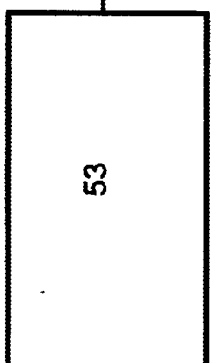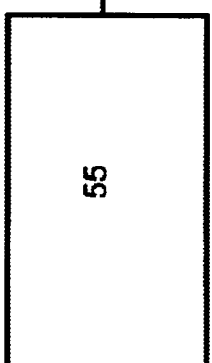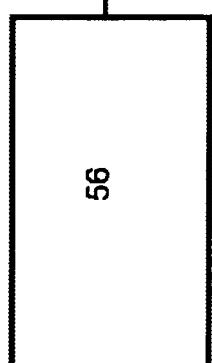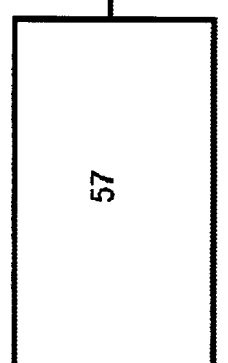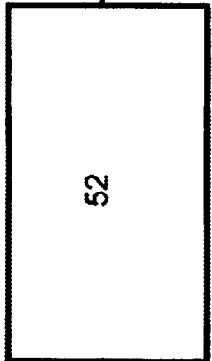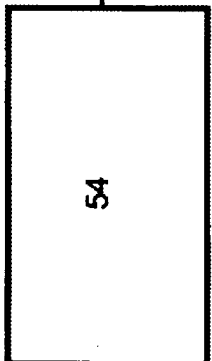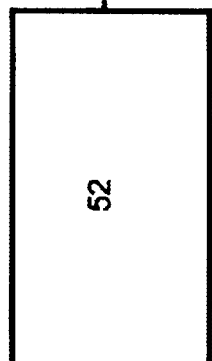
FIG. 3A  FIG. 3B  FIG. 3C  FIG. 3D

BIRD DETERRING APPARATUS

BACKGROUND OF THE INVENTION

1. Field of the Invention

This invention relates generally to deterring birds and other pests from locations where their presence is annoying or harmful. More particularly, this invention relates to visual and acoustic devices for scaring birds and pests, which devices are environmentally acceptable.

2. Related Art

There are many pieces of patent art that address the widespread problems related to intrusion by birds and pests into areas and locations where their presence is unwanted. This art has been particularly creative by involving a broad spectrum of approaches, ranging from simple "scarecrows" to airborne chemicals, magnetic devices and even lasers. Perhaps the most prevalent approaches include devices that produce high levels of sounds. Examples of such devices which produce explosive reports include Hennefer (U.S. Pat. No. 2,304,358); Finch, (U.S. Pat. No. 3,897,195); Troy et al., (U.S. Pat. No. 4,475,102); Joseph (U.S. Pat. No. 5,977,866); and Stonebraker, (U.S. Pat. No. 6,257,146).

A second general approach to deterring birds is to incorporate some form of static or dynamic mechanical device. Such devices range from simple netting for covering fruit-bearing trees and grapevines, to more complex covers and shelters. Other physical deterrents to prevent birds from alighting, perching or roosting at specific sites include an upwardly-extending nail-like probes, closely-spaced coils of wire (e.g. Chatten (U.S. Pat. No. 4,962,619) wind activated ribbons or streamers (e.g. LeMessurier U.S. Pat. No. 4,597,357), and devices with rotating arms and streamers (e.g. Pember, (U.S. Pat. No. 4,074,653).

Examples of less-common approaches include Konzak, Teraoka, and Lehnardt, et al. Konzak (U.S. Pat. No. 4,598,660) uses an "air gun for ejecting a gaseous stream." Teraoka (U.S. Pat. No. 5,353,543) uses magnets, the magnetic fields of which are said to annoy many bird species. Lehnhardt et al, (U.S. Pat. No. 6,250,255) uses pulsing microwaves or supersonic sound waves to cause "reversible unpleasant sensations" in the offending birds and other animals.

Along the lines of the classical scarecrow, Nuttle (U.S. Pat. No. 4,656,770), creates "panic" in selected bird species. This is accomplished with a weathervane-mounted simulated Tiger Cat having streamers attached to various portions of the cat's anatomy. Morningstar (U.S. Pat. No. 6,376,047) deters birds from bodies of water with a simulated floating crocodile.

Finally, examples of the prior art using suspension wires include Ohb, (U.S. Pat. No. 6,003,471), which uses wire members stretched tightly between at least three support port columns and a plurality of magnet members disposed on the wires. Kasiner (U.S. Pat. No. 5,845,607) provides an array of wires stretched across a body of water. The wires, connected to rods, have tightening mechanisms such that they may be "tuned" to generate a "high-pitched whine" in response to the movement of air across the wires. These wires are intended to provide both visual and auditory deterrents to the birds.

In summary, there is no shortage of methods and apparatus purported to deter birds from frequenting localized and broad areas where their presence is considered undesirable. The devices range from simple to complex, and incorporate a dizzying array of approaches, including acoustics, passive and active visual objects, chemical formulations, magnetics, physical barriers and various combinations thereof. Clearly, it can be seen from the art, covering many decades, that a preferred solution has not been found. This extensive prior art also shows that the problem is serious and continuing, Individuals in agriculture know that bird and pest control is increasingly important to increasing profits from farms, orchards, fish-farming, and other businesses, while, at the same time, there is increased pressure to not destroy the birds and pests. Effective solutions may exist for some applications but they are often too complex, unreliable, too expensive, environmentally damaging, and harmful to birds and other animals (and not infrequently, humans).

Thus, it is a primary object of the instant invention to provide a bird-deterring and/or pest-deterring device that is highly effective, yet simple to fabricate and use. It is a further objective to provide a device that is not harmful to birds or damaging to the environment. It is yet another object of this invention to provide a device that is equally effective at a specific site or over a relatively broad area.

SUMMARY OF THE INVENTION

This invention is a deterring apparatus for protecting agricultural crops and other areas from animals that are undesirable in that crop or other area. Particularly, the preferred embodiment is a bird-deterring apparatus for protecting the area of interest from marauding birds, in a way that is economical, effective, and environmentally acceptable.

This invention comprises a system for supporting an elongated member such as a wire or wires above the ground, floor or other surface area on which crops or other plants or items of interest are grown or situated. Preferably, a plurality of nominally upright supports are provided in a spaced-apart relationship, spanning the area to be protected. A wire or wires are tautly secured between these supports, and, preferably, noise-making systems are connected to the taut wire(s) at selected intervals. System(s) for moving/impacting the taut wire(s) and for controlling the moving/impacting are provided. The systems for controlling the impacting/moving are adapted to actuate movement of the taut wire(s) at appropriate or desired times, which movement of the taut wire(s) is adapted to cause noise-production by the noise-making systems. This noise, in turn, scares birds, and preferably other pests, that are or may be present in the protected area.

In the preferred embodiment of this invention, the preferred noise-making systems are containers that make a noise when they are shaken or otherwise significantly disturbed by the moving wire or other elongated member spanning the protected area. Preferably, the containers are sturdy plastic or metal and include a plurality of metal pellets and glass shards, and/or other items that cause a significant and/or irritating noise when shaken or rubbed against the container inner surface.

Also, in the preferred embodiment, the system for moving the wire(s) comprises a member that pulls, strikes, plucks, or otherwise moves the taut wire(s) in a way that cause vibration of the wire(s) and the consequent movement of the container so that the enclosed pellets, glass, or other items cause a grating, metallic, or otherwise frightening sound when these items are, in effect, shaken inside the container. The system for moving the wire(s) may include a connection to the wire(s), for example, by a clamp or other fastener, for pulling or pushing the wire(s) in a quick movement or movements that vibrate/snap the wire. Or, the system for moving the wire(s) may include positioning of a striking or plucking member near/against the wire(s), but not attached to the wire, for striking, brushing, or otherwise impacting the wire(s) in a quick movement or movements that vibrate/snap the wire. The preferred system for causing the wire movement comprises a solenoid, the core portion of which extends to be fastened to the wire, so that, when the solenoid "trips," the solenoid snaps the wire to cause wire motions that may be called "jiggling" or "vibration" of the wire.

The system for controlling/actuating the wire movement may be comprised of a timer and an electrical power circuit, for example, for producing timed and/or random signals to the solenoid for actuating the wire movement, and, hence, the noise. Optionally, the control/actuation may also include a sensor system for actuating the wire movement and, hence, the noise in response to a "sighting" of birds or other pests. Therefore, in the preferred embodiment, the taut wire(s) is/are moved or "plucked" in accordance with a pre-programmed actuation sequence, or, alternatively, the taut wire(s) may be moved only when the presence of birds or other pests is sensed.

BRIEF DESCRIPTION OF THE DRAWINGS

FIG 1A is a schematic perspective view of one embodiment of the invented bird deterrent device deployed over a crop area.

FIGS. 3A, 3B, 3C, and 3D are a set of 4 schematic diagrams showing 4 alternative means for controlling an embodiment of the invention.

DESCRIPTION OF THE PREFERRED EMBODIMENTS

Figure 1B:
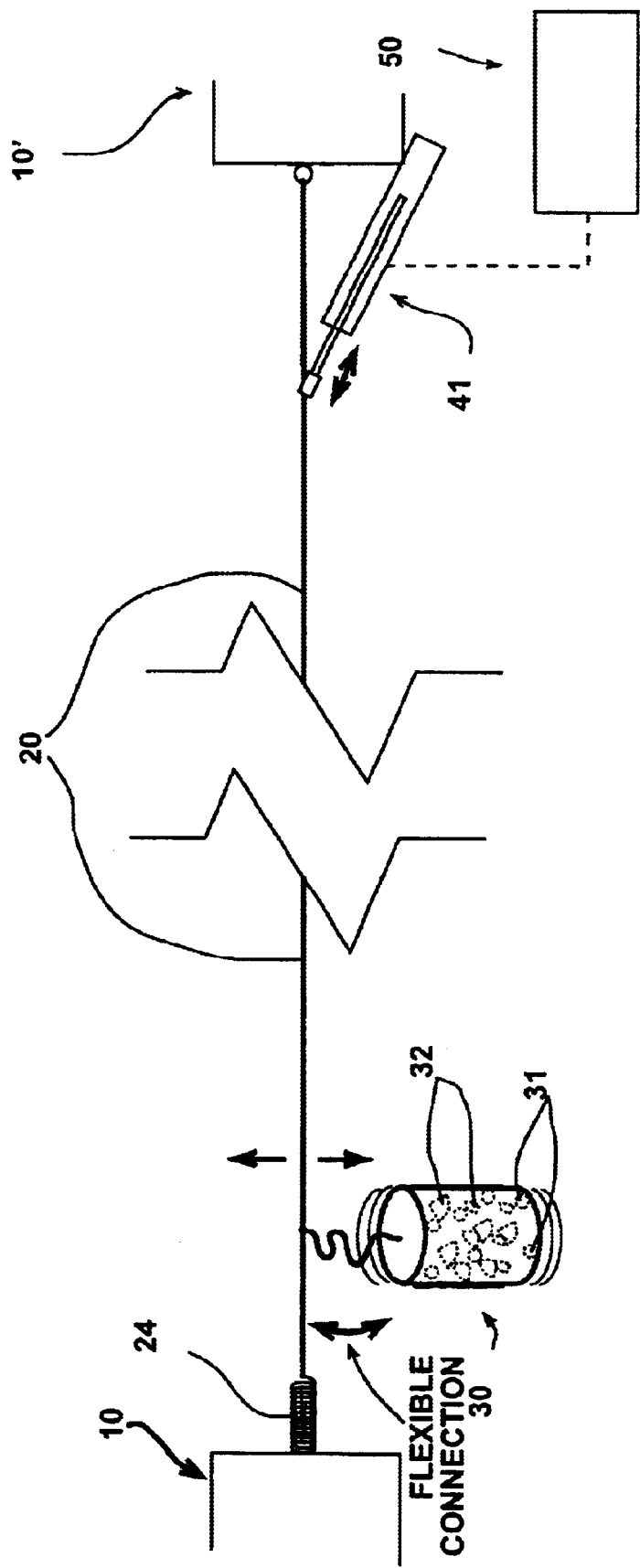
FIG. 1B is a detail view of an embodiment in which a solenoid system is mounted on a support column and is directly attached to the wire.

Referring to the Figures, there are shown several, but not the only, embodiments of the invented bird and/or animal deterring apparatus. As shown in FIGS. 1A and 1B, the preferred embodiments of the bird deterring apparatus 1 comprise a support system, with a plurality of supports 10 or other holders, at least one taut wire 20 securely connected between the supports or holders, preferably at least one noise-making container 30 flexibly suspended from the taut wire, a system 40 for impacting/moving the taut wire 20 and a system 50 for controlling the system 40 for moving the wire. In FIG. 1A, the system for moving 40 and the system for controlling 50 are illustrated, schematically, as a unit below the wire operatively connected to or positioned by the wire 20 by member 22. As discussed in the Summary, the system for moving may be directly fastened to the wire, or positioned near/against but not fastened to the wire, for actuating the wire movement.

As illustrated in FIG. 1B, a preferred embodiment includes a wire 20 connected to a first support 10 by a coil spring 24 and the other end of the wire connected to a second support 10', with a solenoid system 41 being mounted to the second support 10' and fastened directly to the wire near the second support 10'. The coil spring 24 makes the wire taut, and the solenoid system 41 acts to snap or pluck the wire near one end, which is effective at vibrating the entire wire length.

Figure 2B:
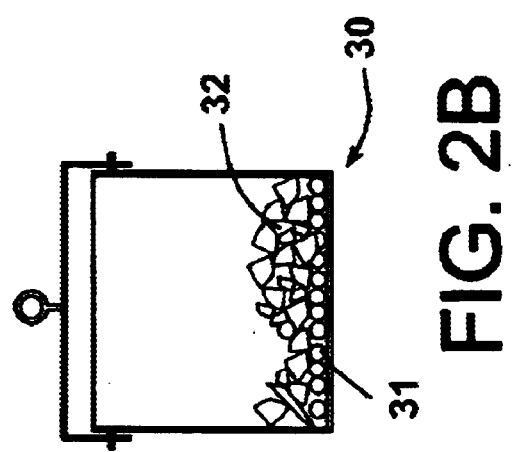
FIG. 2B is a cross-sectional view of the container of FIG. 2A, showing the included metal pellets and glass shards contained therein.
Figure 2A:
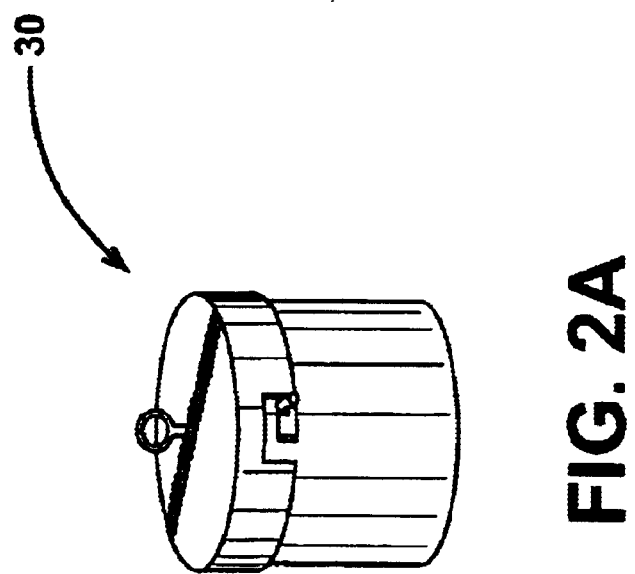
FIG. 2A is a perspective view of one embodiment of the preferred noise-making container for attachment to a wire of the embodiment of FIG. 1.

Referring now to FIG. 2A, noise-making container 30 is formed from a sturdy, hard plastic, and includes a plurality of metal pellets 31 and glass shards 32. Alternatively, container 30 may be made from aluminum, steel or another metal. The metal pellets are preferably steel, usually steel shot. The items contained within the container 30 are chosen so that, when the container is shaken due to movement and vibration of the taut wire, the items move relative to each other and to the inside surface of the container, which results in a metallic, grating, and otherwise irritating or frightening sound that scares birds. Therefore, other materials besides shot and glass may work well, but the inventor has found that the shot and glass combination is particularly frightening to birds.

The system for moving the taut wire or wires is preferably a system that may be disposed near one end of the wire, for example, near one of the supports, and may effectively "pluck," push, or pull the wire from its single location along the wire, preferably from its single location near an end of the wire. Each of the plurality of wires may have its own system for moving that wire, and each system for moving may be individually and independently controlled, or may be synchronized or programmed to act in a preferred pattern of timing. In the preferred embodiment, the system for moving 40 is an electrical solenoid 41, which electrical solenoid 41 may have conventional coil and core portions, as will be understood by one of skill in the art after seeing from this Description how the solenoid is applied in the invented device. As suggested by FIG. 1B, the core portion is connected to the taut wire 20, so that there is a mechanical connection between the solenoid and the taut wire. For example, as illustrated schematically in FIG. 3A, a system for controlling 50 may include timer 52 and first electrical power circuit 53 connected to coil portion 42 of the solenoid. Power may be supplied, for example, by 110 V AC or 12 V DC. If 12 V DC is used, a solar powered battery charger and 12V deep cycle battery is preferably incorporated into the system.

In use, support columns 10 are positioned over the area A to be protected and taut wire 20 is securely connected to the columns 10 above the crop or object to be protected from the marauding birds or other animals or pests. The core portion 43 of the solenoid of the preferred embodiment is then connected to the taut wire. The system for controlling 50 then provides electrical power to the solenoid coil in accordance with the preprogrammed commands from timer 52, which operation cause the connection 22 between the solenoid and the taut wire to pluck the taut wire to an extent that causes the plucked wire to shake and rattle the containers. This shaking/rattling produced the frightening noise, preferably from every container and substantially all along the wire. The timer may be programmed to operate the solenoid for any duration and at regular or, preferably, random intervals. The rate of solenoid operation may be adjusted to set up resonances in the taut wire and noise container(s) such that the noise produced is optimized for the deterrence of the unwanted birds. The duration of each solenoid operation may also be regular or irregular.

Preferably, the overall effect of the timing, duration, and the noise is frightening to the birds, because of the nature of the sound from the container, and the random or irregular nature of the timing, which appears to the birds or other pests as man-made or, at the least, unpredictable. Because the birds or pests sense the noise as random, irregular or unpredictable, the birds/pests do not tend to become accustomed to it, and, so continue to be scared by it, and continue to leave the area being protected in response to the noise.

With reference to FIG. 3B, an alternative system/means for controlling 50 the movement of the taut wire comprises means for sensing 54 the presence of birds and second electrical power circuit 55 whose electrical power output is connected to coil portion 42 of the solenoid. Means for sensing 54 may be, for example, a bird motion sensor, a bird-detecting optical sensor or a sound sensor which actuates upon receiving sounds representative of the unwanted birds.

In yet another alternative embodiment of this invention, the system for moving 40 may be other systems for causing a significant and preferably sudden movement of the wire. For example, the system may be comprised of a gear-motor (not shown) having a motor portion, a gear portion and a rod connecting the gear portion to the taut wire. In this alternative, the motor portion rotates the gear portion which operates the connecting rod in the reciprocating fashion of a connecting rod in an automotive engine. Similar to the operation of the solenoid of the preferred embodiment, the operator may adjust the speed of the motor portion to set up resonances in the taut wire and noise container(s) such that the noise produced is optimized to deter the unwanted birds.

As in the preferred embodiment and depicted in FIGS. 3C and 3D respectively, the means for controlling gear-motor 45 may acceptably be timer 52 and third electrical power circuit 56 or means for sensing 54 and fourth electrical power circuit 57.

In the preferred and other alternatives, the timer, the electrical power sources and the means for sensing the presence of birds may be selected from equipment known to those of skill in the art, after those of skill in the art understand how those pieces of equipment are combined and applied in this invention by reading this Description.

Although the hereinabove described embodiments include a single taut wire connected between two generally upright support columns, it is to be understood that it is acceptable to expand this novel approach to bird deterrence to a two dimensional or even three dimensional array of wires over the area to be protected. For example, multiple wires may be positioned across a nominally horizontal plane and/or multiple wires in a vertical array may be stretched between a single pair of support columns. The operator is free to experiment and test the effectiveness of any or all of these arrangements to match the performance of this invention to the specifics of the specific application. Also, depending on the particulars of the marauding bird problem at hand, alternatives to the preferred metal pellets and glass shards are acceptable.

While the preferred embodiments comprise a solenoid system, other actively actuated systems for moving the wire may be used. The term "actively-actuated system" means systems in which the wire is actively engaged and moved by a force other than the wind or the birds/animals themselves, which may include a motor, a spring system, a solenoid system, hook system, or other mechanical or electrical system which is controlled by the control system. Also, while it is preferred to have noise-making containers hanging from or on the taut wire, the wire itself vibrating may be used as a noise-maker.

Although this invention has been described above with reference to particular means, materials and embodiments, it is to be understood that the invention is not limited to these disclosed particulars, but extends instead to all equivalents within the scope of the following claims.

I claim:

1. An animal-deterring apparatus for protecting agricultural crops and other areas where the presence of birds and other animals is undesirable, said apparatus comprising:
    a support system in the area where the presence of the birds or other animals is undesirable;
    a taut wire secured to the support system to extend in said area;
    an actively-actuated system for moving the taut wire to produce a noise that frightens the birds or other animals, the actively-actuated system comprising a solenoid being connected to said taut wire and adapted to pluck the taut wire; and
    a control system operatively connected to said actively-actuated system for moving the taut wire to control when noise is produced.

2. An animal-deterring apparatus according to claim 1, further comprising a noise-making unit connected to the taut wire, wherein said noise-making unit makes said noise when the taut wire is moved by the actively-actuated system.

3. An animal-deterring apparatus according to claim 2, wherein said noise-making unit is a container with a plurality of metal pellets and glass shards contained within the container.

4. A animal-deterring apparatus according to claim 1, wherein said control system comprises a timer and an electrical power circuit connected to the solenoid and wherein the control system causes the solenoid to move the taut wire in accordance with a pre-programmed actuation sequence.

5. A animal-deterring apparatus according to claim 1, wherein said control system comprises a sensor system for sensing the presence of birds at or near said area being protected, and an electrical power circuit having an electrical power output operatively connected to the solenoid.

6. An animal-deterring apparatus according to claim 5 wherein said sensor system is selected from the group consisting of a motion sensor, an optical sensor and a sound sensor.

7. A bird deterring apparatus for protecting agricultural crops and other areas where the presence of birds is undesirable, said apparatus comprising:
    at least two nominally upright support columns,
    at least one taut wire securely connected between said support columns,
    at least one noise making container flexibly suspended from said taut wire,
    a means for moving taut wire, said means for moving comprising a solenoid having a coil portion and a core portion, the core portion being connected to said taut wire, and
    a means for controlling said means for moving.

8. A bird deterring apparatus according to claim 7 wherein said noise making container is formed from a metal, said container including a plurality of metal pellets and glass shards.

9. A bird deterring apparatus according to claim 7 wherein said means for controlling comprises a timer and an electrical power circuit connected to the coil of the solenoid whereby the taut wire is moved in accordance with a pre-programmed actuation sequence.

10. A bird deterring apparatus according to claim 7 wherein said means for controlling comprises a means for sensing the presence of birds and an electrical power circuit having an electrical power output connected to the coil of the solenoid.

11. A bird deterring apparatus according to claim 10 wherein said means for sensing is selected from the group consisting of a motion sensor, an optical sensor and a sound sensor.

* * * * *